(12) United States Patent
Green et al.

(10) Patent No.: US 10,579,941 B2
(45) Date of Patent: Mar. 3, 2020

(54) SYSTEMS AND METHODS FOR RECOMMENDING PAGES

(71) Applicant: Facebook, Inc., Menlo Park, CA (US)

(72) Inventors: Bradley Ray Green, Snohomish, WA (US); Jason Eric Brewer, Kirkland, WA (US)

(73) Assignee: Facebook, Inc., Menlo Park, CA (US)

( * ) Notice: Subject to any disclaimer, the term of this patent is extended or adjusted under 35 U.S.C. 154(b) by 585 days.

(21) Appl. No.: 15/254,939

(22) Filed: Sep. 1, 2016

(65) Prior Publication Data

US 2018/0060755 A1 Mar. 1, 2018

(51) Int. Cl.
- *G06N 20/00* (2019.01)
- *G06N 3/08* (2006.01)
- *H04L 29/08* (2006.01)

(52) U.S. Cl.
CPC .............. *G06N 20/00* (2019.01); *G06N 3/08* (2013.01); *H04L 67/22* (2013.01)

(58) Field of Classification Search
CPC .... G06N 99/005; G06N 5/022; G06N 3/0445; G06N 20/00; G06F 17/30867; G06Q 50/01; H04L 67/22
See application file for complete search history.

(56) References Cited

U.S. PATENT DOCUMENTS

| | | | | |
|---|---|---|---|---|
| 4,168,301 A * | 9/1979 | Pugh | ........................ | A61K 8/26 424/49 |
| 7,480,667 B2 * | 1/2009 | Harr | .................. | G06F 17/30663 |
| 2011/0184576 A1 * | 7/2011 | Hasan | .................... | G01D 4/002 700/293 |
| 2012/0254188 A1 * | 10/2012 | Koperski | .......... | G06F 17/30663 707/740 |
| 2015/0019640 A1 * | 1/2015 | Li | ........................ | H04L 65/403 709/204 |
| 2015/0294377 A1 * | 10/2015 | Chow | ................ | G06Q 30/0263 705/347 |

(Continued)

OTHER PUBLICATIONS

Tomas Mikolov, Kai Chen, Greg Corrado, Jeffrey Dean, "Word Representation—Word2Vec", Nov. 20, 2015, Hoang Duong Blog (Year: 2015).*

(Continued)

*Primary Examiner* — Eric Nilsson
(74) *Attorney, Agent, or Firm* — Sheppard Mullin Richter & Hampton LLP

(57) ABSTRACT

Systems, methods, and non-transitory computer-readable media can generate layered training data for determining embeddings for entities that are accessible through the social networking system, wherein the layered training data includes layers of data that are organized by a hierarchy, and wherein each layer of data corresponds to entities of a same type. A respective embedding for each entity in a set of entities can be determined, wherein the embeddings are trained iteratively using each layer of data in the layered training data. One or more candidate entities that are related to a first entity can be determined based at least in part on the respective embeddings for the candidate entities and the first entity. At least a first candidate entity from the one or more candidate entities can be provided as a recommendation to a user that formed a connection with the first entity.

17 Claims, 7 Drawing Sheets

(56) References Cited

U.S. PATENT DOCUMENTS

| | | | |
|---|---|---|---|
| 2016/0162456 A1* | 6/2016 | Munro | G06F 17/30011 |
| | | | 704/9 |
| 2017/0357479 A1* | 12/2017 | Shenoy | G06F 3/167 |
| 2018/0278421 A1* | 9/2018 | Karabina | H04L 9/3231 |

OTHER PUBLICATIONS

He, Ruining, et al. "Sherlock: sparse hierarchical embeddings for visually-aware one-class collaborative filtering." arXiv preprint arXiv:1604.05813 (2016). (Year: 2016).*

Chang, Shiyu, et al. "Heterogeneous network embedding via deep architectures." Proceedings of the 21th ACM SIGKDD International Conference on Knowledge Discovery and Data Mining. ACM, 2015. (Year: 2015).*

Levy, Omer, and Yoav Goldberg. "Dependency-based word embeddings." Proceedings of the 52nd Annual Meeting of the Association for Computational Linguistics (vol. 2: Short Papers). vol. 2. 2014. (Year: 2014).*

Wang, Yaoli, et al. "Linked activity spaces: Embedding social networks in urban space." Computational approaches for urban environments. Springer, Cham, 2015. 313-336. (Year: 2015).*

\* cited by examiner

SYSTEMS AND METHODS FOR RECOMMENDING PAGES

FIELD OF THE INVENTION

The present technology relates to the field of content provision. More particularly, the present technology relates to techniques for recommending pages.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, a user may navigate to or be presented with various content items in a social network. The content items can come from pages associated with members of the social network. In some instances, the content items may be of high interest to the user. If the user expresses interest in a particular content item, the social network may attempt, based on the content item, to provide to the user additional content items that would also be of interest to the user. Providing such additional content items can enhance the user experience and may help realize the full potential of the social network. Unfortunately, attempts to provide such additional content items and to maintain a high level of interest from the user often fail. The growing size of social networks can also pose problems with respect to the goal of providing content items of high interest to the user. As available content grows in amount, in theory, the likelihood of finding more content items of high interest to the user should increase. However, in practice, the ability to identify content items of high interest to the user can be complicated by the sheer volume of content.

SUMMARY

Various embodiments of the present disclosure can include systems, methods, and non-transitory computer readable media configured to generate layered training data for determining embeddings for entities that are accessible through the social networking system, wherein the layered training data includes layers of data that are organized by a hierarchy, and wherein each layer of data corresponds to entities of a same type. A respective embedding for each entity in a set of entities can be determined, wherein the embeddings are trained iteratively using each layer of data in the layered training data, and wherein an embedding for an entity is a numerical representation of the entity. One or more candidate entities that are related to a first entity can be determined based at least in part on the respective embeddings for the candidate entities and the first entity. At least a first candidate entity from the one or more candidate entities can be provided as a recommendation to a user that formed a connection with the first entity.

In an embodiment, the systems, methods, and non-transitory computer readable media are configured to generate a first layer of training data based at least in part on sequences of connections formed between users and entities of a first type and generate a second layer of training data based at least in part on traces of nodes in a graph that each correspond to entities of a second type.

In an embodiment, the systems, methods, and non-transitory computer readable media are configured to determine session training data based at least in part on sequences of connections formed between users and entities of a first type, determine synthetic training data based at least in part on traces of nodes in a graph that each correspond to entities of the first type, and generate a first layer of training data based at least in part on a union of the session training data and the synthetic training data.

In an embodiment, the systems, methods, and non-transitory computer readable media are configured to determine the hierarchy of layers in the layered training data, wherein the layers are ranked based at least in part on their respective variance with layers having a lower variance being ranked higher in the hierarchy.

In an embodiment, the systems, methods, and non-transitory computer readable media are configured to determine a first set of embeddings that correspond to entities of a first type based at least in part on a first layer in the layered training data and determine a second set of embeddings that correspond to entities of a second type based at least in part on a second layer in the layered training data, wherein the first layer is ranked higher than the second layer.

In an embodiment, the first set of embeddings remain fixed while the second set of embeddings are determined.

In an embodiment, the systems, methods, and non-transitory computer readable media are configured to train the first set of embeddings using at least one model based at least in part on a skip-gram negative down sampling technique.

In an embodiment, the systems, methods, and non-transitory computer readable media are configured to generate one or more clusters of entities, wherein the entities are clustered based at least in part on their respective embeddings and identify the one or more candidate entities from the clusters, wherein a respective distance measurement between a candidate entity and the first entity satisfies a threshold distance.

In an embodiment, each candidate entity is of a same type as the first entity.

In an embodiment, a respective geographic centroid associated with each candidate entity corresponds to a geographic centroid associated with the first entity.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
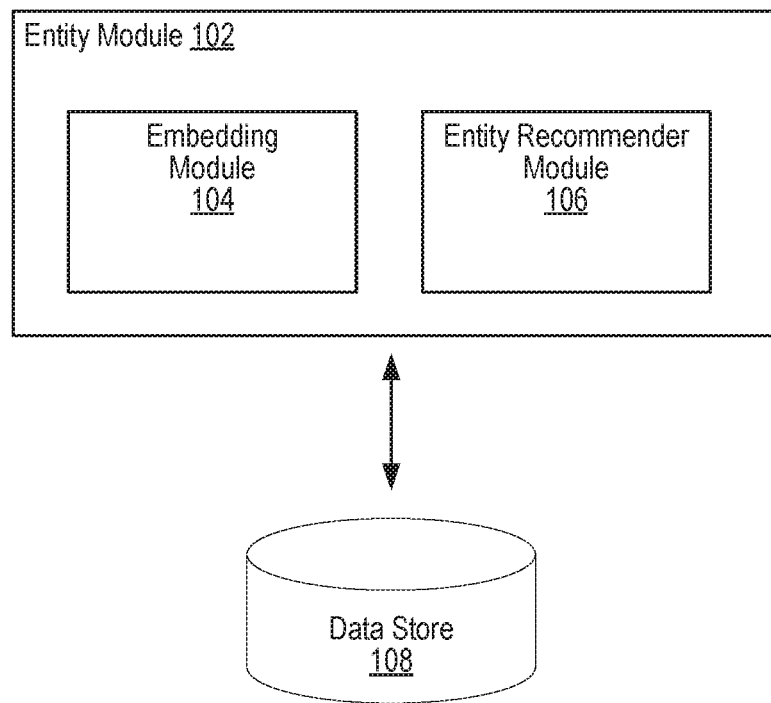
FIG. 1 illustrates an example system including an example entity module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Recommending Pages

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, a user may navigate to or be presented with various content items in a social network. The content items can come from pages associated with members of the social network. In some instances, the content items may be of high interest to the user. If the user expresses interest in a particular content item, the social network may attempt, based on the content item, to provide to the user additional content items that would also be of interest to the user. Providing such additional content items can enhance the user experience and may help realize the full potential of the social network. Unfortunately, attempts to provide such additional content items and to maintain a high level of interest from the user often fail. The growing size of social networks can also pose problems with respect to the goal of providing content items of high interest to the user. As available content grows in amount, in theory, the likelihood of finding more content items of high interest to the user should increase. However, in practice, the ability to identify content items of high interest to the user can be complicated by the sheer volume of content. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, entity recommendations can be generated for users in a social networking system. Such entities can include pages, user profiles, groups, stories, cities, and status updates, to name some examples. A user can interact with an entity in various ways and such interactions can result in the user forming a connection with the entity. For example, an entity may be a page that is accessible through the social networking system. The page may correspond to some type of subject matter (e.g., a business, topic, location, user, etc.). Users of the social networking system can navigate to the page to learn more about the subject matter as well as access and/or post content through the page. Users have the option to be associated with the page, for example, by "liking" the page (e.g., selecting a "like" option through the social networking system) or by becoming a "fan" the page (e.g., selecting a "fanning" option through the social networking system). In this example, a user can form a connection with the page by performing actions such as visiting the page, fanning the page, and/or posting through the page, for example. Other types of interactions through which entity connections can be formed include accessing (or visiting) a user profile, posting to a user profile, friending a user, joining a group, associating with cities, reading stories (e.g., stories presented in a user's news feed), and/or liking a status update. Naturally, this list of interactions is not exhaustive and, depending on the implementation, there may be many other types of interactions through which connections between users and entities may be formed.

In various embodiments, the entity recommendations can be determined from embeddings that are generated using a skip-gram negative down sampling technique. In general, a learning algorithm (e.g., a two-layer neural net) can be used to generate corresponding embeddings (or vectors) for words in sentences. Such embeddings are typically used for natural language processing. In one example, respective embeddings for a sequence of words in a sentence can be learned. Each word embedding can be represented using a vector that has a semantic structure. Such embeddings can be used to determine a word's relation to other words, for example, using vector operations. In various embodiments, a skip-gram negative down sampling technique can be used to generate embeddings for entities in a social networking system using training data that is determined based on user session activity as well as synthetic training data that is generated from an entity graph. For example, the training data can describe sequences of user connections with entities in the social networking system. Additionally, the training data can include synthetic training data that is generated from a weighted graph that describes relationships among various entities in the social networking system.

By using training data that includes both user session activity and synthetic training data, the training process can be optimized for less popular entities that typically have fewer user connections than the more popular entities. For example, in general, fewer users of the social networking system form connections with a page for a local coffee brand while a greater number of users form connections with a page for a nationally known coffee brand. To address this issue, in various embodiments, the embeddings are generated using training data that has been layered based on entity type (e.g., large pages, small pages, user profiles, groups, etc.). For example, the training data can be filtered to extract all entities that correspond to large pages (e.g., popular pages having a threshold number of connections). Similarly, entities corresponding to small pages (e.g., less popular pages having less than a threshold number of connections) can also be extracted. In this example, a set of embeddings can first be trained using the training data corresponding to the large pages. Next, while the embeddings for large pages are fixed, another set of embeddings can be trained using the training data corresponding to the small pages. In various embodiments, embeddings that are fixed do not change based on new training data. Once training is complete, the embeddings for the small pages are able to live in the same space as the large pages without affecting the embeddings for the large pages. In some embodiments, the embeddings can be used to cluster entities that are closely related to one another. In such embodiments, related entities can be determined and recommended to users.

FIG. 1 illustrates an example system 100 including an example entity module 102, according to an embodiment of the present disclosure. As shown in the example of FIG. 1, the entity module 102 can include an embedding module 104 and an entity recommender module 106. In some instances, the example system 100 can include at least one data store 108. The components (e.g., modules, elements, etc.) shown in this figure and all figures herein are exemplary only, and other implementations may include additional, fewer, integrated, or different components. Some components may not be shown so as not to obscure relevant details.

In some embodiments, the entity module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the entity module 102 can be implemented, in part or in whole, as software running on one or more computing devices or systems, such as on a user or client computing device. In one example, the entity module 102, or at least a portion thereof, can be implemented as or within an application (e.g., app), a program, or an applet, etc., running on a user computing device or a client computing system, such as the user device 610 of FIG. 6. In another example, the entity module 102 or at least a portion thereof can be implemented using one or more computing devices or systems that include one or more servers, such as network servers or cloud servers. In some instances, the entity module 102 can, in part or in whole, be implemented within or configured to operate in conjunction with a social networking system (or service), such as the social networking system 630 of FIG. 6.

The entity module 102 can be configured to communicate and/or operate with the at least one data store 108, as shown in the example system 100. The at least one data store 108 can be configured to store and maintain various types of data including, for example, the respective entity connections made by users in the social networking system as well as the time at which such connections were made. The stored data can also include a weighted graph that describes relationships among entities in the social networking system. For example, a node in the graph may correspond to an originating entity that is connected to (i) a node for a first entity, (ii) a node for a second entity, and (iii) a node for a third entity. The edges connecting the originating entity to each of first, second, and third entities can be associated with a respective weight that reflects a proportion of users that have visited (e.g., interacted with or formed a connection with) the originating entity that will also visit a corresponding connected entity. In some implementations, the at least one data store 108 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 108 can store information associated with users, such as user identifiers, user information, profile information, user specified settings, content produced or posted by users, and various other types of user data.

In various embodiments, the embedding module 104 can be configured to generate embeddings for entities. More details regarding the embedding module 104 will be provided below with reference to FIG. 2. The entity recommender module 106 can be configured to provide entity recommendations for users. More details regarding the entity recommender module 106 will be provided below with reference to FIG. 4.

Figure 2:
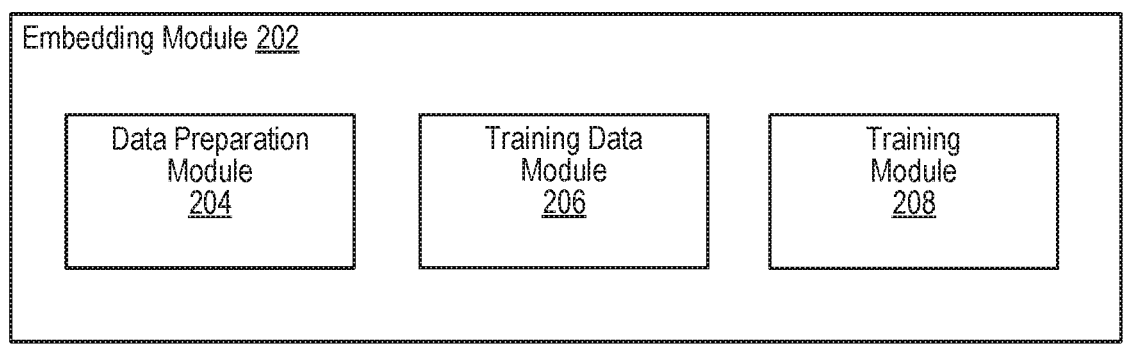
FIG. 2 illustrates an example of an embedding module configured to generate embeddings of entities, according to an embodiment of the present disclosure.

FIG. 2 illustrates an example of an embedding module 202 configured to generate embeddings for entities, according to an embodiment of the present disclosure. In some embodiments, the embedding module 104 of FIG. 1 can be implemented as the embedding module 202. As shown in FIG. 2, the embedding module 202 can include a data preparation module 204, a training data module 206, and a training module 208.

As mentioned, users can interact with entities and such interactions can form connections between users and the corresponding entities. A connection between a user and an entity can form, for example, when the user perform actions, as described above. In various embodiments, the data preparation module 204 is configured to log each connection that is formed between a user and an entity as well as the time (e.g., timestamp) at which the connection was formed. The data preparation module 204 can aggregate this connection data into a respective user connections model m(P) for each user. The user connections model m(P) represents a sequence of connections made by the user over a period of time. One example representation of a user connections model m(P) is as follows:

$$m(P)=\{\{i_1,t_1\},\{i_2,t_2\},\ldots,\{i_n,t_n\}\},$$

where P corresponds to a user, i corresponds to an entity, and where t corresponds to a time at which the user formed a connection with the entity i. In some embodiments, the entities included in the user connections model m(P) are all of the same type (e.g., pages, or user profiles, or status updates). In some embodiments, the entities included in the user connections model m(P) are of mixed types (e.g., pages, user profiles, and status updates).

The training data module 206 is configured to generate layered training data from the respective user connections model for each user as well as from synthetic training data. More details regarding the training data module 206 will be provided below with reference to FIG. 3.

In various embodiments, the training module 208 is configured to train entity embeddings in metric space using a modified skip-gram technique. In this regard, the training module 208, defines a hierarchy of the layered training data that was generated from views of user session activity (e.g., sequences of connections formed between users and entities) and from synthetic training data (e.g., traces of entity nodes as determined from an entity graph), as described in reference to FIG. 3. In some embodiments, this hierarchy can be determined based on the respective signal provided by each layer of the training data. For example, the training module 208 can apply one or more of the skip-gram negative down sampling training procedures for each layer of the training data and measure the respective variance between training iterations. In such embodiments, layers that have a respective variance that is lower, or below a threshold variance, between training iterations are considered to be of higher quality data. In this example, the layers having a respective variance that is lower, or below a threshold variance, can be ranked higher in the hierarchy than other layers. In one example, a hierarchy of page sessions can include a first layer corresponding to large (or media) pages, a second layer corresponding to active pages, a third layer corresponding to owned pages, a fourth layer corresponding to places, and a fourth layer corresponding to all remaining types of pages.

The training module 208 can train embeddings, in turn, starting with a first layer of session training data and synthetic training data in the hierarchy of the layered training data. In various embodiments, the training module 208 is configured to train each layer over the union of the session training data and the synthetic training data. This approach helps strengthen embeddings determined using the session training data using signals from the synthetic training data. Once a set of embeddings are determined using the first layer, the training module 208 fixes the embeddings corresponding to the first layer and trains another set of embeddings using a second layer of data in the hierarchy. In various embodiments, embeddings that are fixed do not change based on subsequent training data. By training the embeddings using this layered approach, the second layer of data is trained to the signal provided by the previous, first layer, thereby preserving the information already extracted from the data in previous layer(s). For example, the training module 208 can train embeddings using a layer corresponding to media pages. The training module 208 can then train embeddings on the union of all data while keeping the embeddings for the media pages fixed.

When training embeddings, for each layer, the training module 208 can associate each entity i with a vector $v_i$. For example, a training sentence may consist of a sequence of entities $i_1, i_2, \ldots, i_n$. A window of length w (e.g., 3, 4, or 5) can be slid across the training sentence so that each of the entities in the sentence are considered in turn (e.g., $i_j, i_{\{j+1\}}, \ldots, i_{\{j+w\}}$). The length of the window parameter is tunable and can vary depending on the implementation.

In various embodiments, the entities chosen for training are uniformly selected. For example, an entity k and entity i may be uniformly selected from a window. Next, the training module 208 can perform the learning step, for example, using stochastic gradient descent on the entity pair k and l. In this step, the training module 208 can calculate $Pr(v_k, v_l)$, where $v_k$ is a vector, or embedding, corresponding to the entity k, and where $v_l$ is a vector, or embedding, corresponding to the entity l. This calculation can be performed by minimizing the following function L:

$$L = \log(Pr(l, k)) \sim \log\left(\frac{e^{[v_k * v_l]}}{\Sigma_{\{s \in entities\}} e^{[v_k * v_l]}}\right).$$

The training module 208 performs a learning step that updates $v_k$ in proportion to the derivative of the function L. The training module 208 performs this approach for every entity that is in every training sentence. In some embodiments, multiple passes over the training data improve the quality of embeddings that are generated.

Figure 3:
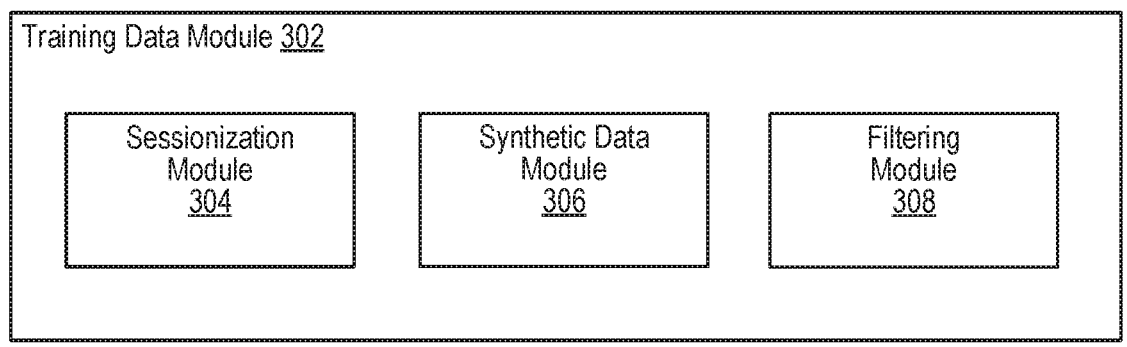
FIG. 3 illustrates an example of a training data module configured to determine training data for generating embeddings of entities, according to an embodiment of the present disclosure.

FIG. 3 illustrates an example of a training data module 302. configured to determine training data for generating embeddings of entities, according to an embodiment of the present disclosure. In some embodiments, the training data module 206 of FIG. 2 can be implemented as the training data module 302. As shown in FIG. 3, the training data module 302 can include a sessionization module 304, a synthetic data module 306, and a filtering module 308.

The sessionization module 304 is configured to sessionize the respective user connections model for each user. In other words, the sessionization module 304 is configured to divide a user connections model into one or more sessions to produce a number of training examples. A session generally refers to a period of time over which a user formed connections with entities. In one example, a session may be defined as the period of time between the time a user logged on to the social networking system and the time the user logged off of the social networking system. In general, sessionization of a user connections model consists of decomposing a sentence (e.g., sequence of a user's entity connections) into smaller sentences (e.g., sessions) while maintaining the relative order of the connections. In some embodiments, the boundaries of these smaller sentences can be based on time. For example, the sessionization module 304 can divide the user connections model into sessions that each measure some period of time (e.g., hour, day, week, etc.). In some embodiments, the sessionization can be based on contiguous runs of user activity that are separated by long periods of inactivity. In such embodiments, a boundary between a first session and a second session is defined by a period of inactivity between the first session and the second session that exceeds a median time between sessions. Thus, for example, if m(P) has activity times $T_s = t_1, t_2, t_3, \ldots, t_n$, the median time between each of the events $T_s$ is calculated (e.g., median($T_s$)). If the time interval between a first sequence of events and a second sequence of events is greater than the median time (e.g., $t_j - t_i > \text{median}(T_s)$), then the first sequence of events and the second sequence of events are each divided into sub-sequences (or sub-sessions). As a result, this produces sessionized training data that consists of sub-sessions of connection activity. The number of sub-sessions is denoted by subsession(m(P)) in the example below:

$$m(P) = \{m_{\{P,1\}}, m_{\{P,2\}}, \ldots, m_{\{P,subsession(m(P))\}}\}.$$

After determining the sub-sessions, the sessionization module 304 can collect and prepare the sub-sessions to be used for training. In some embodiments, the sessionization module 304 discards any sub-sessions that include only one entity. In some embodiments, the sessionization module 304 discards any sub-sessions that have an anomalous length (e.g., a length that exceeds some threshold length).

The synthetic data module 306 is configured to generate synthetic training data to be used for training embeddings. In various embodiments, the synthetic data module 306 generates the synthetic training data from a weighted graph that describes relationships among entities in the social networking system. For example, the graph may include a node for an originating entity that is connected to (i) a node for a first entity, (ii) a node for a second entity, and (iii) a node for a third entity. The edges connecting the originating entity to each of first, second, and third entities can each be associated with a respective weight that reflects a proportion of users that have visited (e.g., interacted with) the originating entity that subsequently visit a corresponding connected entity. In this example, an edge connecting the originating entity node and the first entity node may have a weight of 0.3, an edge connecting the originating entity node and the second entity node may have a weight of 0.4, and an edge connecting the originating entity node and the third entity node may have a weight of 0.3. These weights indicate that 30 percent of users that visit the originating entity subsequently visit the first entity, 40 percent of users that visit the originating entity subsequently visit the second entity, and 30 percent of users that visit the originating entity subsequently visit the third entity. As used herein, the term "visit" can refer to an interaction or the formation of a connection.

To generate the synthetic training data, the synthetic data module 306 can create a set of traces (e.g., 12, 14, 16, etc.) for each node in the graph. Each trace starts from a node in the graph and has a predefined length (e.g., 7, 8, 9, etc.). In general, a trace is a random walk across nodes in the graph. To construct a trace, the synthetic data module 306 selects a first node in the graph and begins the random walk to a second node that is connected to the first node. Next, a third node that is connected to the second node is randomly selected to be included in the trace. This process continues until the trace includes a number of nodes that satisfy the predefined length. In various embodiments, the walk from the starting node involves randomly choosing a second node that is connected to a first node. The second node can be chosen randomly in proportion to the weight of the edge connecting the first node and the second node. Thus, for example, if an edge connecting a node and a node A has a weight of 0.3, an edge connecting the node and a node B has a weight of 0.4, and an edge connecting the node and a node C has a weight of 0.3, then node A will be selected for the trace 30 percent of the time, node B will be selected for the trace 40 percent of the time, and node C will be selected for the trace 30 percent of the time.

Concretely, the synthetic data module 306 creates traces of length l starting from each node in the graph. The starting node $a_0$ marks the beginning of the walk. The synthetic data module 306 then samples l random numbers $r_i$ and appends to the node $b_j$ such that the random number $l_i$ defines the transition from $a_i$ to $b_i$, as described as follows:

$$\Sigma_{\{i<j\}} Pr(a_i \rightarrow b_j) < r_i \leq \Sigma_{\{i \leq j\}} Pr(a_i \rightarrow b_j).$$

As a result, the synthetic data module 306 is able to generate multiple traces for each node in the graph. For example, in some embodiments, the synthetic data module 306 generates 16 traces for each node in the graph with each trace having a length of 8 nodes. In various embodiments, each of these traces forms synthetic training data that comprises a sequence of training data that is similar in content and structure to the sessionized training data described above except that the traces typically do not account for the times corresponding to the interactions with entities. One example representation of the synthetic training data is as follows:

$$n_{\{a \in G, i\}} = \{\{j_1\}, \{j_2\}, \ldots \{j_n\}\},$$

where $n_{a,i}$ corresponds to a trace i for a node a in the graph G, and where $j_n$ is a node n included in the trace i.

In various embodiments, the filtering module 308 can generate a set of views for both the sessionized training data and the synthetic training data. In some embodiments, a view corresponding to the sessionized training data is a filtering of sessions based on an entity type. Thus, for example, a view that corresponds to large pages (e.g., media pages) will include sessions that consist only of entities that correspond to large pages. In another example, a view that corresponds to small pages will include sessions that consist only of entities that correspond to small pages. In some embodiments, a view corresponding to the synthetic training data is a filtering of traces based on entity type. Thus, for example, a view that corresponds to large pages (e.g., media pages) will include traces from the graph that consist only of entities that correspond to large pages. In another example, a view that corresponds to small pages will include traces from the graph that consist only of entities that correspond to small pages. The views generated for the sessionized training data and the synthetic training data form layered training data that is used to generate embeddings for entities. As mentioned, in some embodiments, the training data is layered based on an entity type. For example, one layer of the training data can correspond to large pages, another layer can correspond to small pages, another layer can correspond to user profiles, etc.

Figure 4:
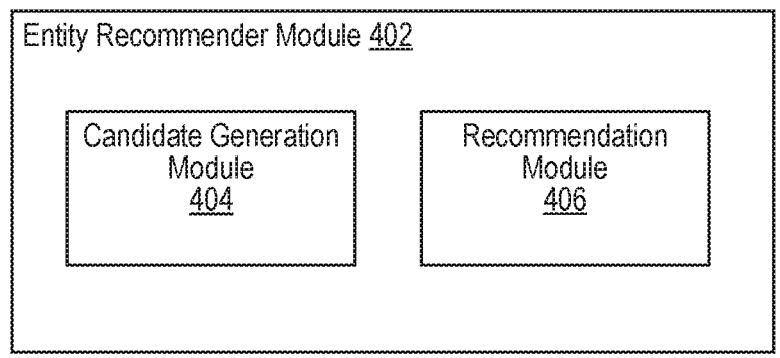
FIG. 4 illustrates an example of an entity recommender module configured to provide entity recommendations, according to an embodiment of the present disclosure.

FIG. 4 illustrates an example of an entity recommender module 402 configured to provide entity recommendations, according to an embodiment of the present disclosure. In some embodiments, the entity recommender module 106 of FIG. 1 can be implemented as the entity recommender module 402. As shown in FIG. 4, the entity recommender module 402 can include a candidate generation module 404 and a recommendation module 406.

Once the embeddings have been collected, the candidate generation module 404 is configured to determine the nearest neighbors for each entity, for example, using the k-nearest neighbors algorithm. In some embodiments, the distance between entities is measured based on the cosine similarity between the respective embeddings of the two entities. Thus, for any given entity i, the number of nearest neighbor entities is determined by a threshold distance $\Theta_i$ between the entity i and the neighbor entity. In other words, the list of neighbor entities for entity i includes all entities j for which the respective cosine similarity between the embedding for entity i ($v_i$) and the embedding for entity j ($v_j$) is greater than the threshold distance $\Theta_i$ (e.g., $\cos(v_i, v_j) > \Theta_i$).

In some embodiments, some, or all, of these neighbor entities can be provided to a user as suggestions when the user makes a connection to the first entity. In some embodiments, neighbor entities can be provided as suggestions provided that one or more criteria is satisfied. For example, in some embodiments, one criteria requires that a neighbor entity of the first entity correspond to the same layer as the first entity. In other words, if the first entity corresponds to a media page, then the neighbor entity must also correspond to a media page, for example. In some embodiments, one criteria requires that a region based on a geographic centroid associated with a neighbor entity correspond to a region based on a geographic centroid associated with the first entity. For example, in some embodiments, a region based on a first geographic centroid corresponds to a region based on a second geographic centroid when there is a threshold overlap between the two regions. When computing centroids, in various embodiments, the respective locations of users that are connected with entities can be evaluated to determine one or more centroids for each entity and to define the distribution of the locations of connections to the entity. Based on the variance of the distribution of user locations, the entity may be classified in a local, regional, country, or global category. For example, the centroid(s) determined for a page entity can be used to determine one or more radii that represent areas of influence for the page. In this example, a geographic region corresponding to a p25 radius that extends from a centroid of the page includes 25 percent of the users that are associated with the page. In another example, a geographic region corresponding to a p50 radius that extends from a centroid of the page includes 50 percent of the users that are associated with the page. Further, a geographic region corresponding to a p75 radius that extends from a centroid of the page includes 75 percent of the users that are associated with the page.

The recommendation module 406 is configured to generate entity recommendations, or suggestions, to users. In various embodiments, the recommendation module 406 can determine candidate entities for every previous connection formed by a user, as described above. The recommendation module 406 can also retrieve features for the candidate entities. The recommendation module 406 can then apply a machine learning (ML) process to predict a positive business outcome (e.g., conversion) from recommending a certain entity to a user. In one example, the recommendation module 406 can train the ML model using features of each entity and user to predict a likelihood that the user will form a connection with the candidate entity. In this example, the recommendation module 406 can rank and provide entity recommendations to a user based on the respective conversion rate that is predicted for each entity.

Figure 5:
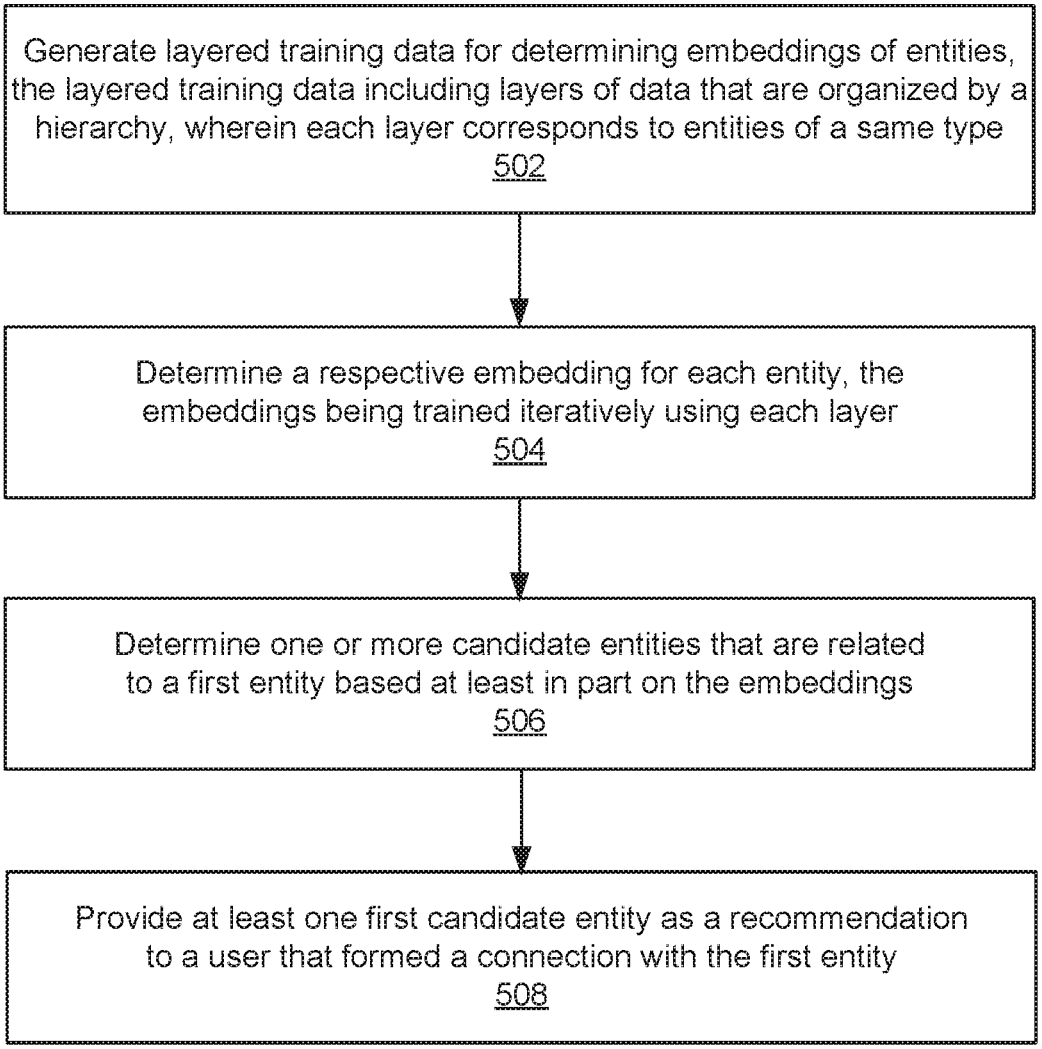
FIG. 5 illustrates an example process for determining page recommendations, according to an embodiment of the present disclosure.

FIG. 5 illustrates an example process 500 for determining page recommendations, according to an embodiment of the present disclosure. It should be appreciated that there can be additional, fewer, or alternative steps performed in similar or alternative orders, or in parallel, within the scope of the various embodiments discussed herein unless otherwise stated. At block 502, layered training data is generated for determining embeddings of entities that are accessible through the social networking system, wherein the layered training data includes layers of data that are organized by a hierarchy, and wherein each layer of data corresponds to entities of a same type. At block 504, a respective embedding for each entity in a set of entities can be determined. The embeddings are trained iteratively using each layer of data in the layered training data. At block 506, one or more candidate entities that are related to a first entity can be determined based at least in part on the respective embeddings for the candidate entities and the first entity. At block 508, at least a first candidate entity from the one or more candidate entities can be provided as a recommendation to a user that formed a connection with the first entity.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
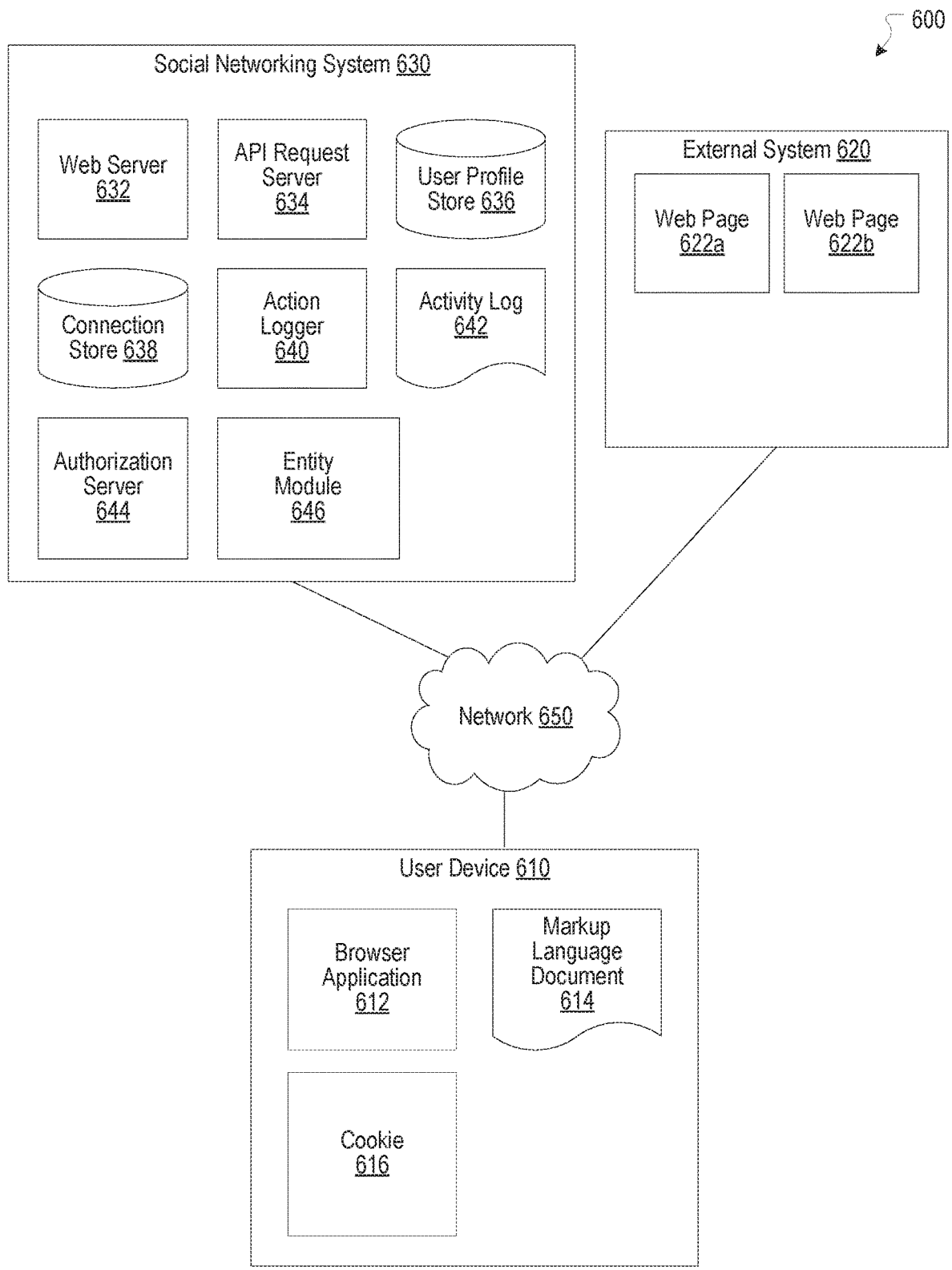
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, the Microsoft Windows® operating system (OS), the Apple OS X® operating system, and/or a Linux® distribution. In another embodiment, the user device 610 can be a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID™. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an entity module 646. The entity module 646 can, for example, be implemented as the entity module 102 of FIG. 1. As discussed previously, it should be appreciated that there can be many variations or other possibilities.

Hardware Implementation

Figure 7:
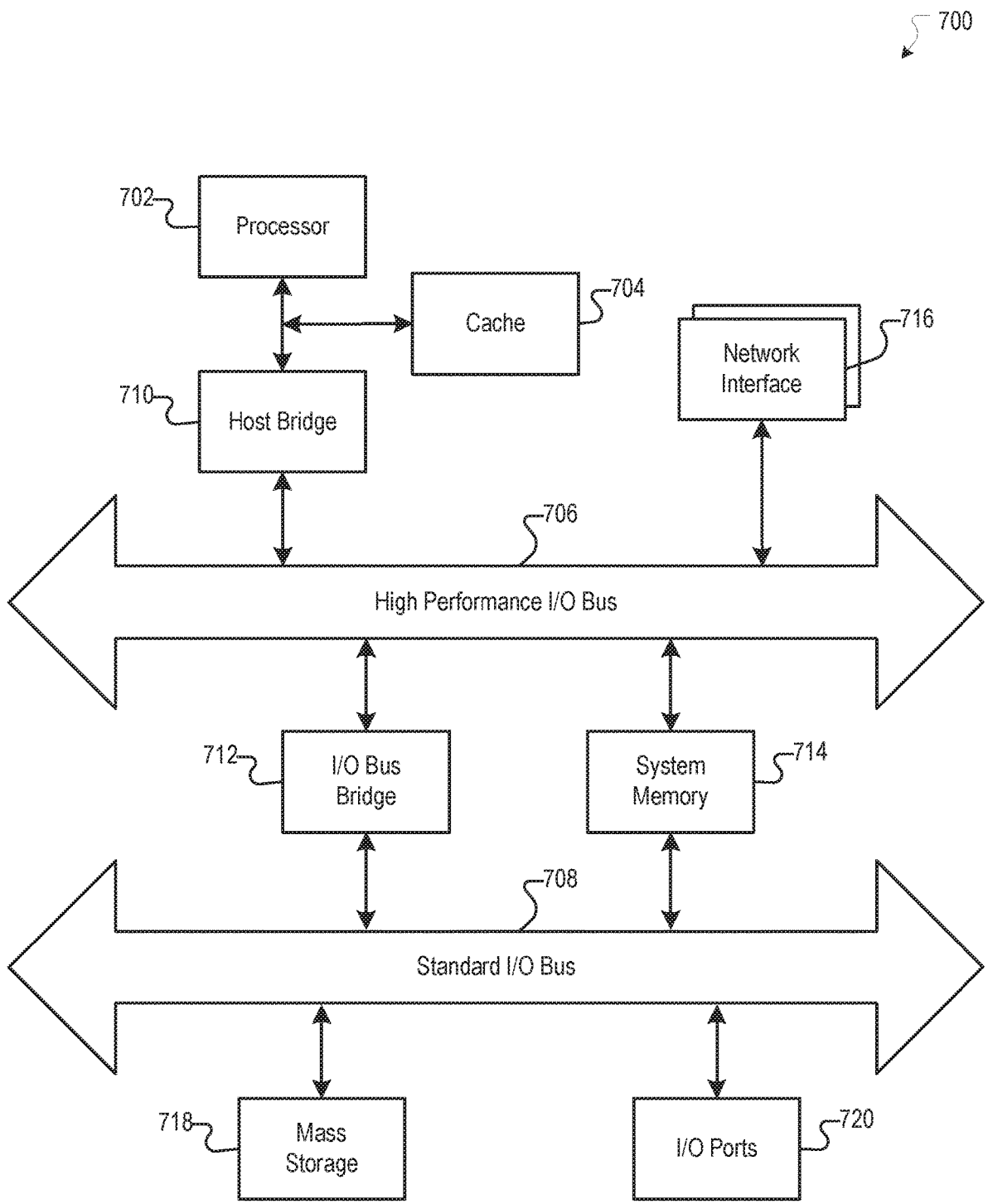
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    generating, by a social networking system, layered training data for determining embeddings for entities that are accessible through the social networking system, wherein the layered training data includes layers of data that are organized by a hierarchy, and wherein each layer of data corresponds to entities of a same type;
    determining, by the social networking system, a respective embedding for each entity in a set of entities, wherein the embeddings are trained iteratively using each layer of data in the layered training data, wherein, for each layer, respective variance between the training iterations is measured, and wherein an embedding for an entity is a numerical representation of the entity;
    determining, by the social networking system, one or more candidate entities that are related to a first entity based at least in part on the respective embeddings for the candidate entities and the first entity; and
    providing, by the social networking system, at least a first candidate entity from the one or more candidate entities as a recommendation to a user that formed a connection with the first entity,
    wherein the hierarchy of layers in the layered training data is determined such that the layers are ranked based at least in part on the respective variance with layers having a lower variance being ranked higher in the hierarchy.

2. The computer-implemented method of claim 1, wherein generating the layered training data further comprises:
    generating, by the social networking system, a first layer of training data based at least in part on sequences of connections formed between users and entities of a first type; and
    generating, by the social networking system, a second layer of training data based at least in part on traces of nodes in a graph that each correspond to entities of a second type.

3. The computer-implemented method of claim 1, wherein generating the layered training data further comprises:
    determining, by the social networking system, session training data based at least in part on sequences of connections formed between users and entities of a first type;
    determining, by the social networking system, synthetic training data based at least in part on traces of nodes in a graph that each correspond to entities of the first type; and
    generating, by the social networking system, a first layer of training data based at least in part on a union of the session training data and the synthetic training data.

4. The computer-implemented method of claim 1, wherein determining the respective embedding for each entity in the set of entities further comprises:
    determining, by the social networking system, a first set of embeddings that correspond to entities of a first type based at least in part on a first layer in the layered training data; and
    determining, by the social networking system, a second set of embeddings that correspond to entities of a second type based at least in part on a second layer in the layered training data, wherein the first layer is ranked higher than the second layer.

5. The computer-implemented method of claim 4, wherein the first set of embeddings remain fixed while the second set of embeddings are determined.

6. The computer-implemented method of claim 4, wherein determining the first set of embeddings further comprises:
    training, by the social networking system, the first set of embeddings using at least one model based at least in part on a skip-gram negative down sampling technique.

7. The computer-implemented method of claim 1, wherein determining the one or more candidate entities that are related to the first entity further comprises:
    generating, by the social networking system, one or more clusters of entities, wherein the entities are clustered based at least in part on their respective embeddings; and
    identifying, by the social networking system, the one or more candidate entities from the clusters, wherein a respective distance measurement between a candidate entity and the first entity satisfies a threshold distance.

8. The computer-implemented method of claim 1, wherein each candidate entity is of a same type as the first entity.

9. The computer-implemented method of claim 1, wherein a respective geographic centroid associated with each candidate entity corresponds to a geographic centroid associated with the first entity.

10. A system comprising:
at least one processor; and
a memory storing instructions that, when executed by the at least one processor, cause the system to perform:
generating layered training data for determining embeddings for entities that are accessible through the social networking system, wherein the layered training data includes layers of data that are organized by a hierarchy, wherein, for each layer, respective variance between the training iterations is measured, and wherein each layer of data corresponds to entities of a same type;
determining a respective embedding for each entity in a set of entities, wherein the embeddings are trained iteratively using each layer of data in the layered training data, and wherein an embedding for an entity is a numerical representation of the entity;
determining one or more candidate entities that are related to a first entity based at least in part on the respective embeddings for the candidate entities and the first entity; and
providing at least a first candidate entity from the one or more candidate entities as a recommendation to a user that formed a connection with the first entity,
wherein the hierarchy of layers in the layered training data is determined such that the layers are ranked based at least in part on the respective variance with layers having a lower variance being ranked higher in the hierarchy.

11. The system of claim 10, wherein generating the layered training data further causes the system to perform:
generating a first layer of training data based at least in part on sequences of connections formed between users and entities of a first type; and
generating a second layer of training data based at least in part on traces of nodes in a graph that each correspond to entities of a second type.

12. The system of claim 10, wherein generating the layered training data further causes the system to perform:
determining session training data based at least in part on sequences of connections formed between users and entities of a first type;
determining synthetic training data based at least in part on traces of nodes in a graph that each correspond to entities of the first type; and
generating a first layer of training data based at least in part on a union of the session training data and the synthetic training data.

13. The system of claim 10, wherein determining the respective embedding for each entity in the set of entities further causes the system to perform:
determining a first set of embeddings that correspond to entities of a first type based at least in part on a first layer in the layered training data; and
determining a second set of embeddings that correspond to entities of a second type based at least in part on a second layer in the layered training data, wherein the first layer is ranked higher than the second layer.

14. A non-transitory computer-readable storage medium including instructions that, when executed by at least one processor of a computing system, cause the computing system to perform a method comprising:
generating layered training data for determining embeddings for entities that are accessible through the social networking system, wherein the layered training data includes layers of data that are organized by a hierarchy, wherein, for each layer, respective variance between the training iterations is measured, and wherein each layer of data corresponds to entities of a same type;
determining a respective embedding for each entity in a set of entities, wherein the embeddings are trained iteratively using each layer of data in the layered training data, and wherein an embedding for an entity is a numerical representation of the entity;
determining one or more candidate entities that are related to a first entity based at least in part on the respective embeddings for the candidate entities and the first entity; and
providing at least a first candidate entity from the one or more candidate entities as a recommendation to a user that formed a connection with the first entity,
wherein the hierarchy of layers in the layered training data is determined such that the layers are ranked based at least in part on the respective variance with layers having a lower variance being ranked higher in the hierarchy.

15. The non-transitory computer-readable storage medium of claim 14, wherein generating the layered training data further causes the computing system to perform:
generating a first layer of training data based at least in part on sequences of connections formed between users and entities of a first type; and
generating a second layer of training data based at least in part on traces of nodes in a graph that each correspond to entities of a second type.

16. The non-transitory computer-readable storage medium of claim 14, wherein generating the layered training data further causes the computing system to perform:
determining session training data based at least in part on sequences of connections formed between users and entities of a first type;
determining synthetic training data based at least in part on traces of nodes in a graph that each correspond to entities of the first type; and
generating a first layer of training data based at least in part on a union of the session training data and the synthetic training data.

17. The non-transitory computer-readable storage medium of claim 14, wherein determining the respective embedding for each entity in the set of entities further causes the computing system to perform:
determining a first set of embeddings that correspond to entities of a first type based at least in part on a first layer in the layered training data; and
determining a second set of embeddings that correspond to entities of a second type based at least in part on a second layer in the layered training data, wherein the first layer is ranked higher than the second layer.

* * * * *